United States Patent
Mangalindan

(10) Patent No.: US 10,732,669 B2
(45) Date of Patent: Aug. 4, 2020

(54) SERIAL PERIPHERAL INTERFACE AND METHODS OF OPERATING SAME

(71) Applicant: Micron Technology, Inc., Boise, ID (US)

(72) Inventor: Paolo E. Mangalindan, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 342 days.

(21) Appl. No.: 15/667,907

(22) Filed: Aug. 3, 2017

(65) Prior Publication Data

US 2017/0329363 A1 Nov. 16, 2017

Related U.S. Application Data

(63) Continuation of application No. 13/826,723, filed on Mar. 14, 2013, now Pat. No. 9,753,487.

(51) Int. Cl.
 *G06F 1/12* (2006.01)
 *G06F 13/42* (2006.01)
 *G06F 1/3234* (2019.01)

(52) U.S. Cl.
 CPC .......... *G06F 1/12* (2013.01); *G06F 1/3278* (2013.01); *G06F 13/4282* (2013.01); *Y02D 10/14* (2018.01); *Y02D 10/151* (2018.01)

(58) Field of Classification Search
 None
 See application file for complete search history.

(56) References Cited

U.S. PATENT DOCUMENTS

| | | | |
|---|---|---|---|
| 5,511,204 A | 4/1996 | Crump et al. | |
| 5,594,360 A | 1/1997 | Vvojciechowski | |
| 7,996,580 B2 | 8/2011 | Rave et al. | |
| 8,504,759 B2 | 8/2013 | Villa et al. | |
| 2005/0055591 A1 | 3/2005 | Cho | |
| 2005/0160316 A1 | 7/2005 | Shipton | |
| 2007/0220499 A1* | 9/2007 | Bannatyne ........... H01R 13/665 |
| | | | 717/140 |
| 2011/0017828 A1 | 1/2011 | Pine et al. | |
| 2012/0089851 A1 | 4/2012 | Ting et al. | |
| 2013/0290606 A1 | 10/2013 | Alessi et al. | |
| 2013/0297987 A1 | 11/2013 | Gupta et al. | |
| 2013/0325998 A1* | 12/2013 | Hormuth ........... G06F 15/17331 |
| | | | 709/212 |
| 2014/0006864 A1 | 1/2014 | Menon et al. | |
| 2014/0108686 A1* | 4/2014 | Wagh .................... G06F 13/385 |
| | | | 710/106 |
| 2014/0269471 A1* | 9/2014 | Wagh ................ H04W 52/0203 |
| | | | 370/311 |
| 2014/0269881 A1* | 9/2014 | He .................... H04L 25/03878 |
| | | | 375/231 |
| 2014/0281641 A1* | 9/2014 | Herrera Mejia .......... G06F 1/24 |
| | | | 713/330 |
| 2014/0281753 A1* | 9/2014 | Wagh .................. G06F 13/4295 |
| | | | 714/56 |

(Continued)

*Primary Examiner* — Henry Tsai
*Assistant Examiner* — Christopher A Bartels
(74) *Attorney, Agent, or Firm* — Brooks, Cameron & Huebsch, PLLC

(57) ABSTRACT

Serial peripheral interfaces and methods of operating the same are provided. An apparatus can have a serial peripheral interface (SPI) including a first command state machine (CSM), and a second CSM.

20 Claims, 10 Drawing Sheets

(56) References Cited

U.S. PATENT DOCUMENTS

| | | | |
|---|---|---|---|
| 2015/0089259 A1* | 3/2015 | Warren | G06F 1/325 |
| | | | 713/322 |
| 2015/0169036 A1* | 6/2015 | Sodhi | G06F 1/3243 |
| | | | 713/320 |
| 2015/0185809 A1* | 7/2015 | Bharadwaj | G06F 1/3253 |
| | | | 713/323 |
| 2015/0277532 A1* | 10/2015 | Mishaeli | G06F 1/3206 |
| | | | 713/324 |
| 2016/0285757 A1* | 9/2016 | Srivastava | H04L 12/10 |
| 2016/0306770 A1* | 10/2016 | Mishra | G06F 13/385 |
| 2016/0357692 A1* | 12/2016 | Lu | G06F 13/4081 |
| 2017/0185550 A1* | 6/2017 | Chellappan | G06F 13/37 |
| 2018/0011813 A1* | 1/2018 | Mann | G06F 1/10 |
| 2018/0039322 A1* | 2/2018 | Weissmann | G06F 1/3287 |
| 2018/0173659 A1* | 6/2018 | Denboer | G06F 13/364 |

* cited by examiner

SERIAL PERIPHERAL INTERFACE AND METHODS OF OPERATING SAME

PRIORITY INFORMATION

This application is a Continuation of U.S. application Ser. No. 13/826,723, the specification of which is incorporated herein by reference.

TECHNICAL FIELD

The present disclosure related generally to semiconductor devices, and more particularly to a serial peripheral interface and methods of operating the same.

BACKGROUND

Memory devices are typically provided as internal, semiconductor, integrated circuits in computers or other electronic devices. Memory devices are utilized for a wide range of electronic applications such as personal computers, portable memory sticks, solid state drives (SSDs), digital cameras, cellular telephones, portable music players such as MP3 players, movie players, and other electronic devices. In addition to efforts to decrease the size of memory and memory devices, efforts are being made to increase the speed of communicating with memory and memory devices, and decrease the power consumption of memory and memory devices.

Various Serial Peripheral Interface (SPI) devices can be configured to receive/transmit data synchronously in a first transfer rate (1TR), e.g., a single transfer rate (STR), or a second transfer rate (2TR), e.g., double transfer rate (DTR). A SPI device in STR mode means that the device synchronously receives data on one edge of the clock, e.g., a rising edge, and synchronously transmits data on the other edge of the clock, e.g., a falling edge. A SPI device in Double Transfer Rate (DTR) mode means that the device synchronously receives and transmits data on both edges of the clock, e.g., rising and falling edges.

As SPI devices try to achieve higher DTR frequencies, and thus higher data communication rates, SPI devices may also be configured to enter a deep-power-down (DPD) mode in order to curtail power consumption when not communicating data. DPD mode is a lowest power consumption state for a device other than power down, e.g., off. DPD mode is a lower power consumption state than a standby mode, for example.

DETAILED DESCRIPTION

Figure 1:
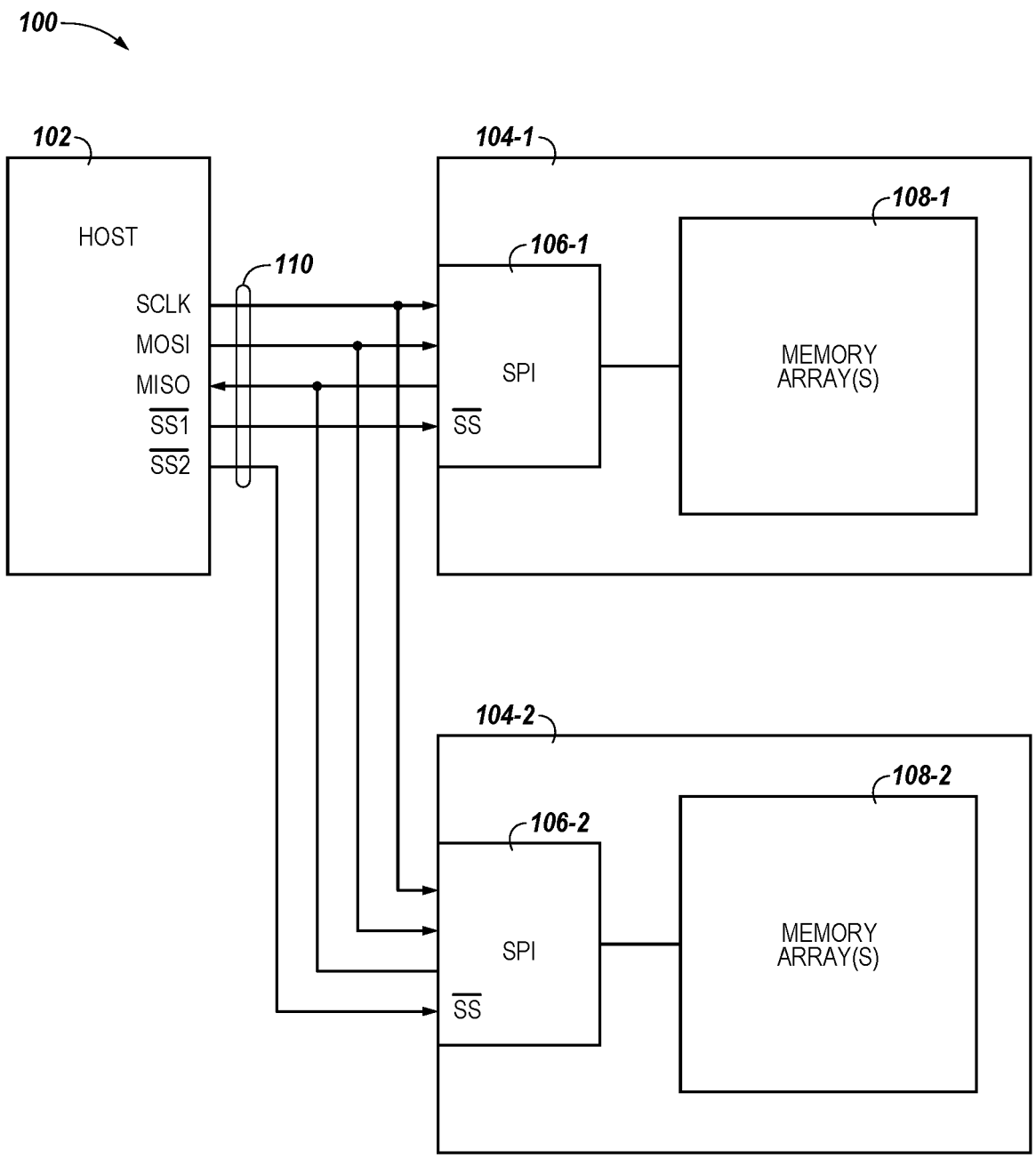
FIG. 1 is a block diagram of a prior art apparatus in the form of a computing system.

Serial peripheral interfaces and methods of operating the same are provided. An example apparatus can have a serial peripheral interface (SPI) including a first command state machine (CSM), and a second CSM.

Serial Peripheral Interface (SPI) devices can be configured to receive/transmit data synchronously at a Single Transfer Rate (STR) in an STR mode and/or Double Transfer Rate (DTR) in a DTR mode. SPI devices are also able to enter a deep-power-down (DPD) mode while in either of the STR or DTR modes, and leave the DPD mode while in either of the STR or DTR modes. However, an SPI device operating in both a DTR mode and DPD mode presents unique challenges. As SPI devices try to achieve higher frequencies, e.g., DTR frequencies, it becomes more difficult to reliably process commands by using a command state machine (CSM) that runs on an internally frequency-multiplied, e.g., frequency-doubled, clock.

A CSM state machine is a sequential logic circuit that is in only one command state at a time. The CSM can transition from one command state to another when initiated by a triggering event or condition, as defined by the list of command states, and the transitions therebetween. For example, a CSM can perform a predetermined sequence of actions depending on a sequence of events, e.g., commands, with which the CSM is presented.

As DTR SPI products try to achieve higher frequencies, it can become more challenging for the clock frequency-doubling circuit to reliably double the frequency. The frequency-doubling circuit may use internally generated voltage references so as to be more independent of the external voltage variations in order to improve its signal reliability at higher frequencies. While in DPD mode, power savings may be achieved in many ways. One of the ways to achieve power savings can affect clock frequency-doubling circuits, such as by disabling generation of internal voltage references. However, by doing so, clock frequency-doubling circuits that use such internally-generated voltage references during DPD mode can become unreliable. Therefore, operation of a CSM simultaneously in DTR and DPD modes, which uses the frequency doubled clock signal, can also become unreliable.

In DPD mode, power may be reduced to circuits that support data receipt and transmission, which is not occurring in DPD mode. As a result, these circuits may not be reliable during power conservation efforts, and/or a primary CSM may not be operable for another reason in DPD mode. Therefore, it can be particularly challenging to reliably process commands when the SPI device has to operate in both DTR and DPD modes. This disclosure provides methods and apparatuses by which an SPI device is able to synchronously process commands reliably while in DTR and DPD modes, while retaining a configuration able to synchronously process commands in a legacy fashion during various other modes, e.g., STR mode with DPD enabled or disabled, or in a DTR mode with DPD disabled.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Also, as used herein, "a number of" a particular element and/or feature can refer to one or more of such elements and/or features.

As used herein, the term "substantially" intends that the modified characteristic need not be absolute, but is close enough to the absolute characteristic so as to achieve the advantages of the characteristic.

FIG. 1 is a block diagram of a prior art apparatus in the form of a computing system 100 including at least one serial peripheral interface (SPI) 106-1, 106-2. The computing system 100 can include a host 102 and a number of memory devices 104-1, 104-2. The memory devices 104-1, 104-2 can include an SPI 106-1, 106-2 coupled to a number of memory arrays 108-1, 108-2, as shown in FIG. 1.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices, e.g., a number of processors.

As used herein, the host 102, a memory device 104-1, 104-2, and/or a memory array 108-1, 108-2 might also be separately considered an "apparatus." The memory device 104-1, 104-2 can be a solid state drive (SSD), for instance, and can include a controller, e.g., a processor, and/or other control circuitry not shown in FIG. 1. A memory device 104-1, 104-2 can comprise a number of memory arrays 108-1, 108-2.

The Serial Peripheral Interface Bus 110 is a synchronous serial data communication link that can operate in full duplex mode. SPI is often referred to as a four-wire serial bus or Synchronous Serial Interface (SSI). The host 102 and memory devices 104-1, 104-2 communicate in master/slave manner, with the host 102 operating as the master device and the memory devices 104-1, 104-2 operating as the slave devices. The master device initiates the data frame.

The SPI bus 110 can include a serial clock (SCLK) signal, a master-output slave-input (MOSI) signal, and a master-input slave-output (MISO) signal. The SCLK and MOSI signals are output from the master device, and the MISO signal is output from the slave devices.

The SPI bus 110 can operate with a single master device and with one or more slave devices. Multiple slave devices are allowed with individual slave select (SS), e.g., chip select, lines. As used herein, the convention of a bar over a signal name, as is shown in the figures, or a "B" placed after a signal name, as may be indicated in figures or in text descriptions, e.g., SELECTB, is a convention that indicates a signal that is active low. As shown in FIG. 1, the individual SS signals are output from the master device and are active low. Slave devices can have tri-state outputs so their MISO signal becomes high impedance (logically disconnected) when the device is not selected.

To begin a communication, the master device first configures the clock, for example, using a frequency less than or equal to the maximum frequency that the slave device supports. Such frequencies are commonly in the range of 1-100 MHz. The master device then transmits the logic 0 for the desired slave over the appropriate slave select (SS) line, thereby activating the slave. If a waiting period is required (such as for analog-to-digital conversion), then the master must wait for at least that period of time before starting to issue clock cycles.

During each SPI clock cycle, a full duplex data transmission can occur. The master device can send a bit on the MOSI line and the slave device reads it from that same line, and/or the slave device can send a bit on the MISO line and the master device reads it from that same line. Shift registers can be used to buffer the serial data for further processing, for example, such as writing a word of data to a memory array 108-1, 108-2.

Figure 2:
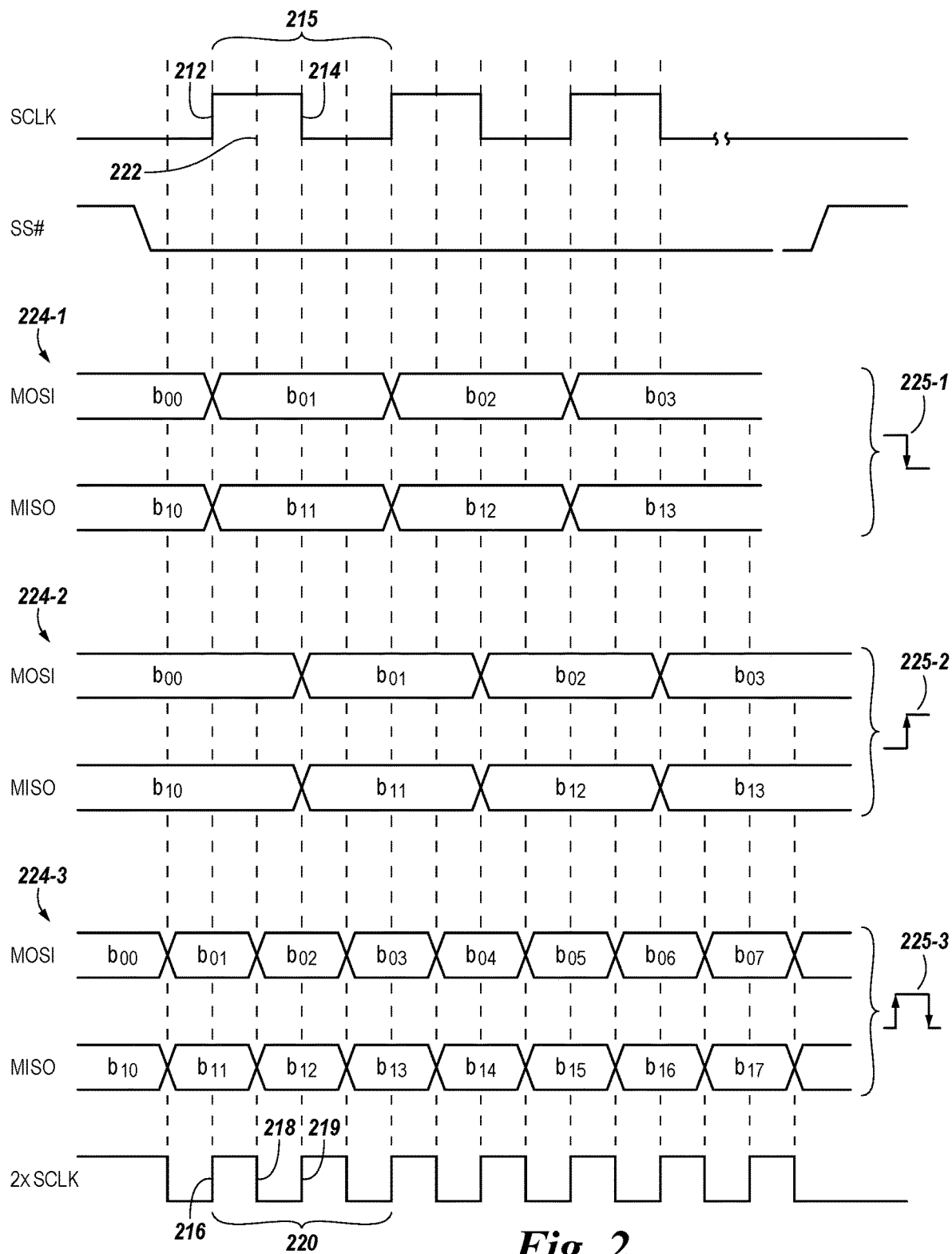
FIG. 2 shows timing diagrams illustrating operation of a prior art serial peripheral interface.

Transmissions often consist of N-bit words, where N can be 8, 12, or 16, among other values. The master device can initiate multiple such transmissions as necessary. Transmissions may involve any number of clock cycles. When there is no more data to be transmitted, the master device can stop toggling its clock and deselect the particular slave device. The slave device(s) on the bus that is not activated using a respective chip select line disregards the input clock and MOSI signals, and does not drive MISO. As serial communication arrangement, the master device can select only one slave device at a time. In addition to setting the clock frequency, the master device can also configure the clock polarity and phase with respect to the data. FIGS. 2, 6, and 7 describe timing sequences further.

FIG. 2 shows timing diagrams illustrating operation of a prior art serial peripheral interface. A serial clock (SCLK) signal and a slave select (SS #) signal are shown at the top of FIG. 2 and may, for example, each be generated by a master device. As such, the SCLK signal can also be referred to as an external clock signal. That is, the SCLK signal is generated external to the SPI. Each cycle 215 of the SCLK signal includes two edge types, a rising edge 212 in which the SCLK signal transitions from low to high, and a falling edge 214 in which the SCLK signal transitions from high to low. Within each of the high and low portions of the SCLK signal, an intermediate time 222 at which the clock signal is substantially stable at one level may also be identified. As previously discussed, the master device can drive the SS # signal low to activate a particular slave device and then start the SCLK signal alternating between a low and high level at a particular clock frequency.

FIG. 2 also illustrates a number of sets 224-1, 224-2, 224-3 of MOSI and MISO signals associated with master and slave devices. In this example, the MOSI and MISO signals of set 224-1 are associated with master and slave devices configured to receive, e.g., capture, and transmit, e.g., propagate, data on the falling edge 214 of the SCLK signal (as indicated by the symbol 225-1). The SCLK signal can be, for example, the clock signal generated by a master device and received at a slave device, e.g., with an SPI. As shown in FIG. 2, transitions in the MOSI and MISO signals of set 224-1 correspond to the rising edge 212 of the SCLK signal, and the MOSI and MISO signals of set 224-1 are stable at respective bit values corresponding to the falling edge 214 of the SCLK signal. The MOSI and MISO signals of set 224-1 are usually stable (at the location at which a particular signal is received) for the half cycle until the next clock transition. SPI master and slave devices may well sample data at different points in that half cycle.

The set of MOSI and MISO signals of set 224-2 shown in FIG. 2 are associated with master and slave devices configured to receive and transmit data on a rising edge 212 of the SCLK signal (as indicated by the symbol 225-2). Transitions in the set 224-2 MOSI and MISO signals correspond to the falling edge 214 of the SCLK signal, and the set 224-2 MOSI and MISO signals are stable at respective bit values corresponding to the rising edge 212 of the SCLK signal. The two sets 224-1, 224-2 of MOSI and MISO signals associated with a falling edge of the SCLK signal and a rising edge of the SCLK signal respectively, correspond to master and slave devices operating in STR mode, but with different clock phasing, e.g., polarities.

According to various embodiments of the present disclosure, the MOSI and MISO signals of set 224-1 and 224-2 in FIG. 2 reflect operation of a first CSM, e.g., a legacy CSM, in STR mode, which may also include operations of the first CSM in a DPD mode. Such command processing operations are synchronized to the SCLK, the clock signal generated by a master device and received at the SPI, which can remain unaffected, and thus reliable, while the SPI is in a DPD mode. STR mode means that the SPI synchronously receives data on one edge of the clock, e.g., a rising edge, and synchronously transmits data on the other edge of the clock, e.g., a falling edge.

The MOSI and MISO signals of set 224-3 shown in FIG. 2 above a frequency-multiplied, e.g., frequency-doubled, clock signal (2×SCLK). The 2×SCLK signal is shown having a rising edge, e.g., first rising edge 216, and a falling edge, e.g., falling edge 218, within each period. However, because the frequency is doubled, two clock cycles 220 occur within each clock cycle 215 of the SCLK signal shown at the top of FIG. 2. According to various embodiments, the SCLK signal may be the clock signal generated by the master device and communicated to a slave device, and the 2×SCLK signal may be internally generated within a slave device (as is discussed further with respect to FIG. 3).

Where master and slave devices are configured to receive and transmit data on a rising edge of a clock signal, e.g., SCLK signal, but where the clock signal is the 2×SCLK signal as shown in FIG. 2, e.g., frequency doubled, rather than the SCLK signal shown in FIG. 2, the MOSI and MISO signals of set 224-3 result. That is, the MOSI and MISO signals of set 224-3 are associated with master and slave devices configured to receive data on the 2×SCLK signal rising edge 216 and transmit data on the 2×SCLK signal falling edge 218. As shown in FIG. 2, transitions in the MOSI and MISO signals of set 224-3 correspond to the falling edge 218 of the 2×SCLK signal, and the MOSI and MISO signals of set 224-3 are stable at respective bit values corresponding to the rising edge 216 of the 2×SCLK signal.

However, with respect to the SCLK signal generated by the master device, and because a first rising edge 216 of the 2×SCLK signal corresponds with a rising edge 212 of the SCLK signal and a second rising edge 219 of the 2×SCLK signal corresponds with a falling edge 214 of the SCLK signal, the MOSI and MISO signals of set 224-3 appear as if the bit values are stable and transmitted/received on both the rising edge 212 and falling edge 214 of the SCLK signal, as noted by the rising/falling symbol 225-3. The transitions in the MOSI and MISO signals of set 224-3 occur at an intermediate time, e.g., 222, at which the clock signal is substantially stable at each level.

In this manner, a first CSM that is configured to process commands, e.g., transmit/receive data, synchronized to one edge of a clock signal can be used with a frequency multiplied clock to appear to process commands on each edge of the base clock signal. As such, a first CSM can implement not only STR mode, but also DTR mode, as long as the frequency-multiplied clock signal is available and reliable, which may not be the case in DPD mode.

However, embodiments of the present disclosure are not limited to master and slave devices configured to transmit/receive data on the 2×SCLK signal rising edge 216 of the 2×SCLK as indicated by signals 224-3. Master and slave devices can be configured to transmit/receive data on the 2×SCLK signal falling edge 218 of the 2×SCLK, resulting in MOSI and MISO signals shifted by one half period from those shown by the signals of set 224-3, for example. The frequency-multiplied clock, e.g., 2×SCLK, can be configured to have other phase shifting and frequency multiplying orientations with respect to the SCLK signal generated by the master device. A SPI device in DTR mode means that the device synchronously receives/transmits data on both the rising and falling edges of the clock signal, as was discussed for the MOSI and MISO signals of set 224-3.

According to some embodiments of the present disclosure, in order for legacy SPI architectures to use the same command state machine (CSM) during STR and DTR modes, the CSM is synchronized on the rising edge of the external clock during STR mode and the CSM is synchronized on the rising edge of a frequency-doubled version of the external clock, e.g., 2×SCLK, during DTR mode. According to various embodiments, by using a CSM synchronized on the rising edge of two different clock signals, e.g., SCLK and 2×SCLK, the SPI device is able to synchronously process commands in a legacy fashion, e.g., in STR mode with DPD enabled/disabled or in DTR mode with DPD disabled.

According to various embodiments of the present disclosure, the MOSI and MISO signals of set 224-3 in FIG. 2 reflect operation of a first CSM, e.g., a legacy CSM, in DTR mode, except operations of the first CSM in a DPD mode, which is discussed further below. Such command processing operations are synchronized to the particular clock signal received at the first CSM such as the SCLK in STR mode, as discussed with respect to signals 224-1 and 224-2, and synchronized to the 2×SCLK in DTR mode when not also in DPD mode, as discussed with respect to signals 224-3. When the SPI is in DTR mode, and not also in DPD mode, the 2×SCLK clock signal is powered and reliably functional. DTR mode means that the SPI synchronously transmits and receives data on each edge of the clock, and a first CSM processing commands synchronized to the 2×SCLK appears to be.

Figure 3A:
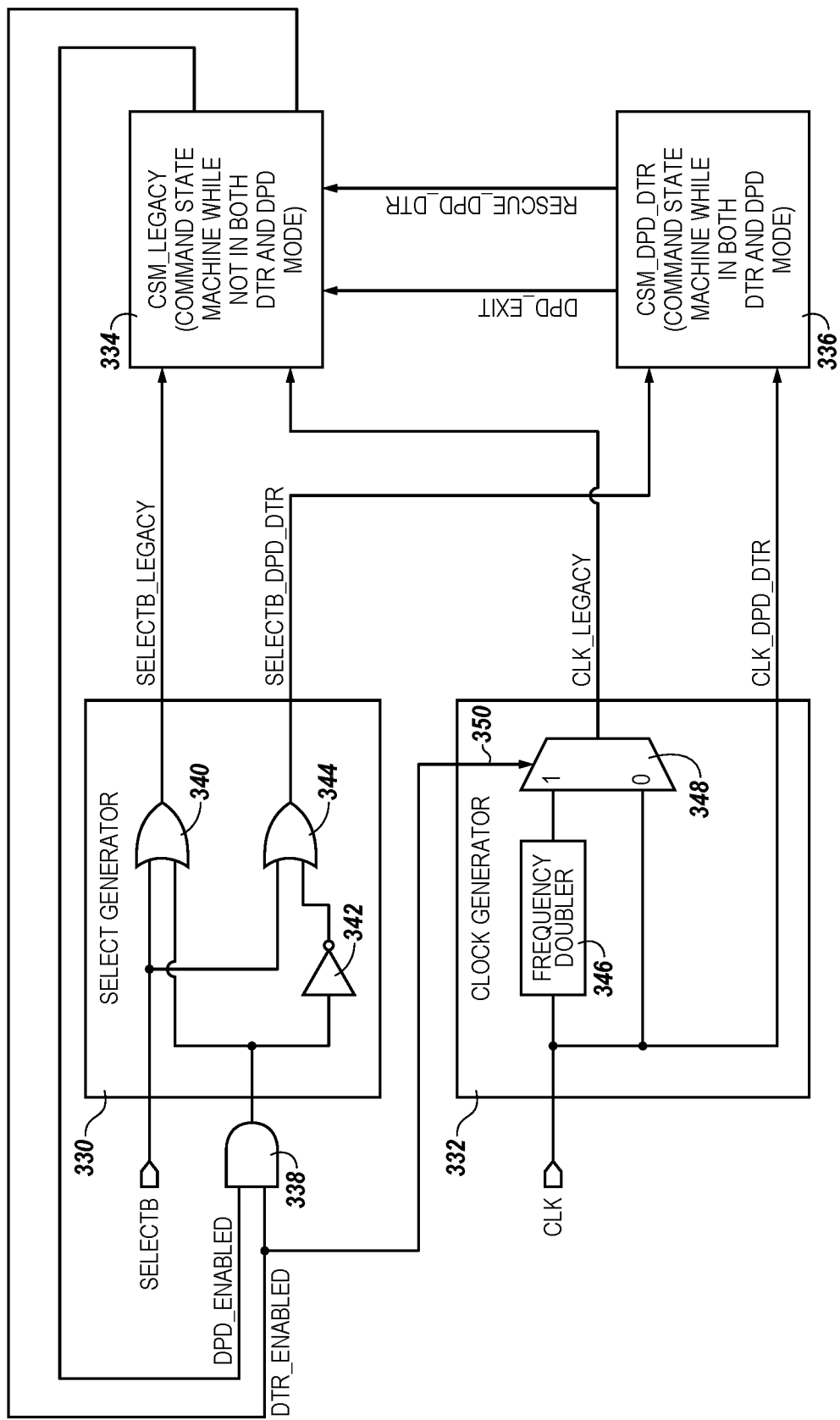
FIG. 3A illustrates a serial peripheral interface in accordance with a number of embodiments of the present disclosure.

FIG. 3A illustrates a serial peripheral interface (SPI) in accordance with a number of embodiments of the present disclosure. According to various embodiments of the present disclosure, the SPI can include a first CSM 334 and a second CSM 336. The first CSM 334 can be a legacy CSM that is configured to operate on one edge of a clock signal, such as the SCLK clock signal generated by a master device and received at the SPI or a frequency-multiplied, e.g., frequency-doubled, clock signal generated by the slave device or SPI. That is, the first CSM 334 can be configured to operate as shown by the timing diagrams illustrated in FIG. 2 while the SPI is in modes other than both DTR mode and DPD mode. That is, the first CSM 334 can be operational in STR mode with DPD enabled or disabled, and in DTR mode with DPD disabled, for example.

According to various embodiments of the present disclosure, the second CSM 336 can be operational when the first CSM 334 is not operational. For example, the second CSM 336 can be operational while the SPI is in both DTR mode and DPD mode. The second CSM 336 can be configured to process commands, e.g., transmit/receive data, synchronized to each edge of a clock signal, e.g., process commands on both rising and falling edges of a clock signal such as the SCLK clock signal generated by a master device and received at the SPI, which remains reliable even in DPD mode. The second CSM 336 being configured to process commands synchronized to each edge of a clock signal is configured differently than the first CSM 334, which is configured to process commands synchronized to one edge of a frequency-multiplied clock signal, e.g., 2×SCLK, that is received at the first CSM and therefore appears to process commands synchronized to each edge of a different, slower, base clock signal, e.g., SCLK, that is received at the SPI.

The SPI shown in FIG. 3A can also include additional circuitry, e.g., logic, to select one of the first CSM 334 or second CSM 336 to be operational, e.g., processing commands, such that only one CSM is operational at any given time. FIG. 3A shows a select generator 330 communicatively coupled to the first CSM 334 by a SELECTB_LEGACY signal line (indicating the select signal is active low to select the first CSM 334) and to the second CSM 336 by a SELECTB_DPD_DTR signal line (indicating the select signal is active low to select the second CSM 336). The second CSM 336 can be coupled to the first CSM 334 by a DPD_EXIT signal line and/or a RESCUE_DPD_DTR signal line. The signals on the DPD_EXIT signal line and RESCUE_DPD_DTR signal line are discussed further with respect to the timing diagrams illustrated in FIGS. 6 and 7.

The select generator 330 is shown having two inputs, a SELECTB signal line, and the output of AND gate 338, with AND gate 338 having a DPD_ENABLED signal line and DTR_ENABLED signal line as inputs. The select generator 330 is shown having two outputs coupled to the SELECTB_LEGACY signal line and the SELECTB_DPD_DTR signal line respectively.

The SELECTB_LEGACY signal line is the output of OR gate 340, which has as inputs the SELECTB signal line input to the select generator 330 and the output of AND gate 338. The output of AND gate 338 is inverted by inverting buffer 342. The SELECTB_DPD_DTR signal line is the output of OR gate 344, which has as inputs the SELECTB signal line input to the select generator 330 and the output of inverting buffer 342.

FIG. 3A also shows a clock generator 332 communicatively coupled to the first CSM 334 by a CLK_LEGACY signal line and to the second CSM 336 by a CLK_DPD_DTR signal line. The clock generator 332 receives an input clock on the CLK input signal line, which can be driven, for example by a clock signal received from a master device, e.g., SCLK shown in FIG. 1 and discussed with respect to FIG. 2.

The clock generator 332 can be configured such that the CLK input signal line is coupled to a frequency doubler 346. The output of the frequency doubler 346 can be one input to a multiplexer 348 within the clock generator 332. The CLK input signal line can be coupled directly to multiplexer 348 as a second input, and the output of multiplexer 348 coupled to the CLK_LEGACY signal line. The DTR_ENABLED signal line can also be coupled to the clock generator 332 multiplexer 348 as a selection control 350, which can be used to select between the CLK signal line input or the frequency double 346 output input to the multiplexer 348 to route through to the multiplexer 348 output, e.g., CLK_LEGACY signal line.

According to various embodiments, the selection control 350 of multiplexer 348 can be derived from logic that is asserted only when DTR mode is enabled and DPD mode is not enabled such that the CLK_LEGACY signal output from multiplexor 348 is not selected by the multiplexor 348 to be from the frequency doubler 346, in order to prevent unnecessary internal clock toggling when SELECTB=0 and the CSM_LEGACY 334 is not being used to process commands. Other logic to appropriately pass the output of the frequency doubler 346 to the output of multiplexor 348, e.g., CLK_LEGACY, only when the frequency doubled clock signal is (or can be) used by the CSM_LEGACY 334 can also be implemented according to the present disclosure, e.g., DTR_ENABLED and not DPD_ENABLED. The second output of the clock generator 332, e.g., CLK_DPD_DTR signal line, can be coupled to the CLK signal line.

According to various embodiments, one legacy method for handling the (1) STR mode with DPD enabled/disabled or (2) DTR mode with DPD disabled involves the SELECTB_LEGACY and CLK_LEGACY signal lines and the legacy CSM 334, e.g., "csm_legacy." As mentioned above, legacy CSM 334 is operational while the SPI is in modes other than both DTR and DPD together, e.g., not in both DTR and DPD modes simultaneously. The CLK_LEGACY signal (on the CLK_LEGACY signal line) can be the raw clock signal, e.g., SCLK from the CLK signal line when the DTR_ENABLED signal is set to 0. The CLK_LEGACY signal can be selected to be the frequency-doubled version of the CLK, e.g., 2×SCLK, when the DTR_ENABLED signal is set to 1.

The legacy CSM 334 can be configured to only use the rising edge of the CLK_LEGACY signal to synchronously process commands. The CLK signal on the CLK_LEGACY signal line when DTR mode is not enabled, e.g., in STR mode with DPD enabled or disabled, is a reliable signal since even in DPD mode, the CLK signal does not depend on operability of the frequency double 346. And the frequency-doubled clock signal, e.g., 2×SCLK output from the frequency doubler 346, is reliable in DTR mode when not in DPD mode (which can impact operability of the frequency doubler 346).

According to various embodiments of the present disclosure, the second CSM 336, referred to as the DTR+DPD CSM 336, e.g., "csm_dpd_dtr," is operational to process commands when the SPI is both in DTR and DPD modes together. The DTR+DPD CSM 336 can be configured to support a small quantity of commands compared to the legacy CSM 334 because there are only a very few number of commands allowed during DPD mode. That is, the DTR+DPD CSM 336 can be configured to support processing a subset of commands that legacy CSM 334 is capable of processing, for example, commands to recover from DPD mode, among others.

The SELECTB_DPD_DTR signal (the signal on the SELECTB_DPD_DTR signal line) and CLK_DPD_DTR signal (the signal on the CLK_DPD_DTR signal line) are used to synchronize the DTR+DPD CSM 336. According to some embodiments, the DTR+DPD CSM 336 is configured to use both the rising and falling edges of CLK_DPD_DTR to synchronously process commands. In order to ensure that only one CSM is operating during a command sequence, logic inside the "Select Generator" block forces the SELECTB_LEGACY signal to 1, and the SELECTB_DPD_DTR signal tracks the state of SELECTB when the DTR_ENABLED signal is set to 1 and the DPD_ENABLED signal is set to 1. Otherwise, the SELECTB_LEGACY signal tracks the state of the SELECTB signal, and the SELECTB_DPD_DTR signal is forced to 1 when the DTR_ENABLED signal is set to 0 or the DPD_ENABLED signal is set to 0. As the DTR+DPD CSM 336 does not use the frequency-doubled clock, e.g., 2×SCLK, since it may be unreliable during DPD mode, the CLK_DPD_DTR signal sources the CLK signal, e.g., SCLK. The DTR_ENABLED and DPD_ENABLED signals are synchronously set or reset by commands in the legacy CSM 334. However, the DTR+DPD CSM 336 can have the capability of asynchronously resetting those signals through the DPD_EXIT and/or RESCUE_DPD_DTR signals.

According to some embodiments of the present disclosure, the SPI can be configured such that a first CSM capable of processing commands on one edge type, e.g., rising edge, is selected to process commands while the SPI is not in a Deep Power Down (DPD) mode and not selected to process commands while the SPI is in the DPD mode. The SPI can be further configured such that a second CSM capable of processing commands on each edge type, e.g., rising and falling edges, is selected to process commands while the SPI is in the DPD mode and not selected to process commands while the SPI is not in the DPD mode.

According to some embodiments of the present disclosure, the SPI can be configured to selectively enable the second CSM to process commands based on an operational characteristic associated with the first CSM. For example, the operational characteristic associated with the first CSM can include an inability to properly process commands such as an inability to properly process commands due to at least one of a failure of the first CSM, a loss of power to the first CSM, and a degraded clock signal to the first CSM. The operation of the SPI shown in FIG. 3A is discussed further with respect to FIGS. 6A and 7A.

Figure 3B:
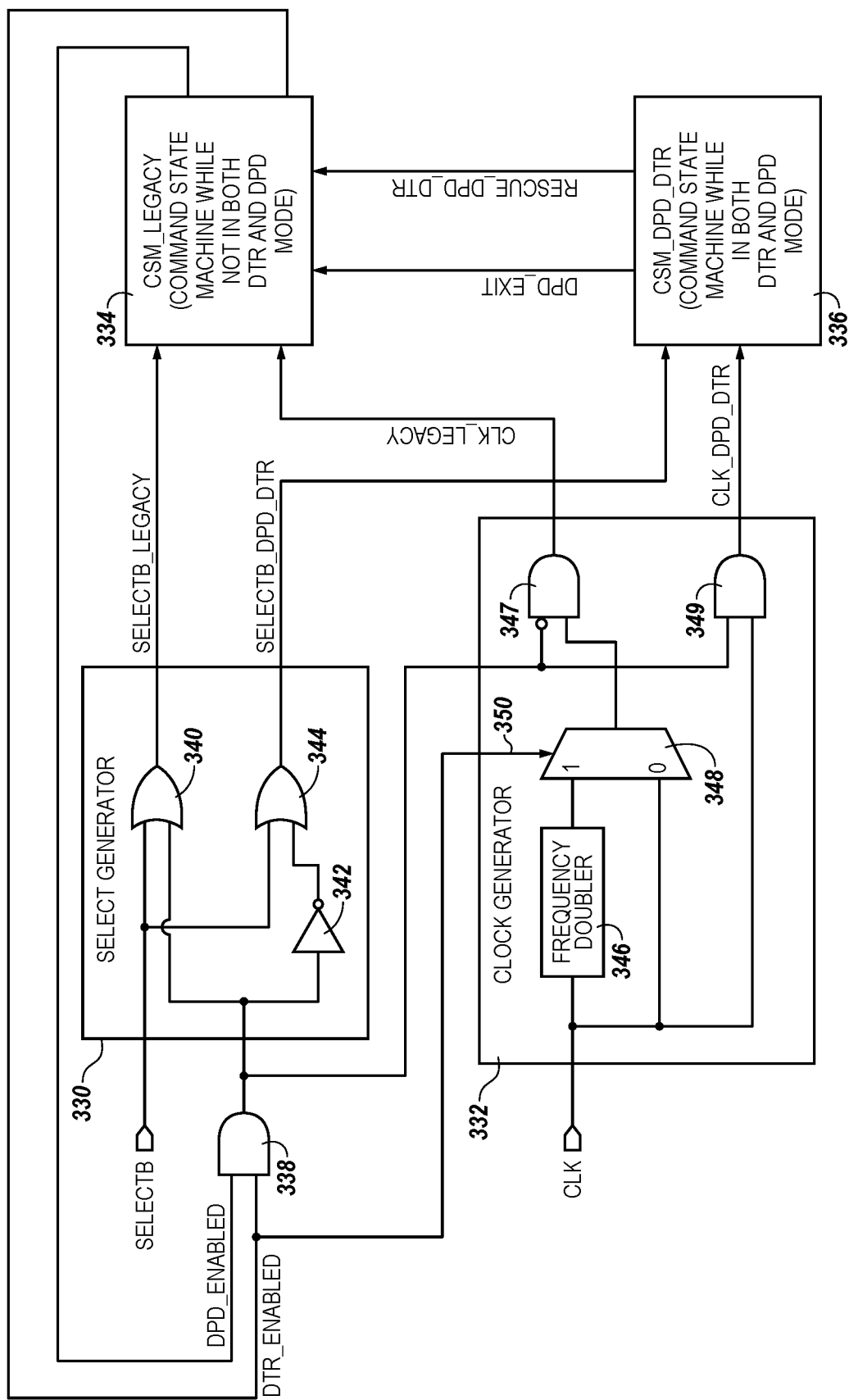
FIG. 3B illustrates a serial peripheral interface with gated clock signals in accordance with a number of embodiments of the present disclosure.

FIG. 3B illustrates a serial peripheral interface (SPI) with gated clock signals in accordance with a number of embodiments of the present disclosure. FIG. 3B is a circuit similar to that described above with respect to FIG. 3A with the addition of AND gate 347 and AND gate 349 to gate the particular clock signals, e.g., CLK_LEGACY and CLK_DPD_DTR, provided to the respective command state machines, e.g., CSM_LEGACY 334 and CSM_DPD_DTR 336.

As is shown in FIG. 3B, the output of AND gate 347 is the CLK_LEGACY signal to CSM_LEGACY 334. One input to AND gate 347 is the output of multiplexer 348, which corresponds to the CLK signal when the SPI is not in DTR mode, and corresponds to a frequency-doubled version of the CLK signal when the SPI is in DTR mode. The second input to AND gate 347 is the inverted output of AND gate 338. The output of AND gate 338 is asserted when the SPI is in both the DTR and DPD modes. As such, in FIG. 3B the CLK_LEGACY signal follows the output of multiplexer 348 only when the SPI is not in both the DTR and DPD modes, e.g., when CSM_LEGACY 334 is selected to process commands. The CLK_LEGACY signal is not periodically toggling between states when the SPI is in both the DTR and DPD modes, which can save on power consumption by gating the CLK_LEGACY signal that is not being used.

As is further shown in FIG. 3B, the output of AND gate 349 is the CLK_DPD_DTR signal to CSM DPD_DTR 336. One input to AND gate 349 is the CLK signal. The second input to AND gate 349 is the inverted output of AND gate 338, which is asserted when the SPI is in both the DTR and DPD modes. As such, in FIG. 3B the CLK_DPD_DTR signal follows the output of the CLK signal only when the SPI is in both the DTR and DPD modes, e.g., when CSM_DPD_DTR 336 is selected to process commands. The CLK DPD_DTR signal is not periodically toggling between states when the SPI is not in both the DTR and DPD modes, which can save on power consumption by gating the CLK_DPD_DTR signal that is not being used. The operation of the SPI shown in FIG. 3B is discussed further with respect to FIGS. 6B and 7B.

Figure 4:
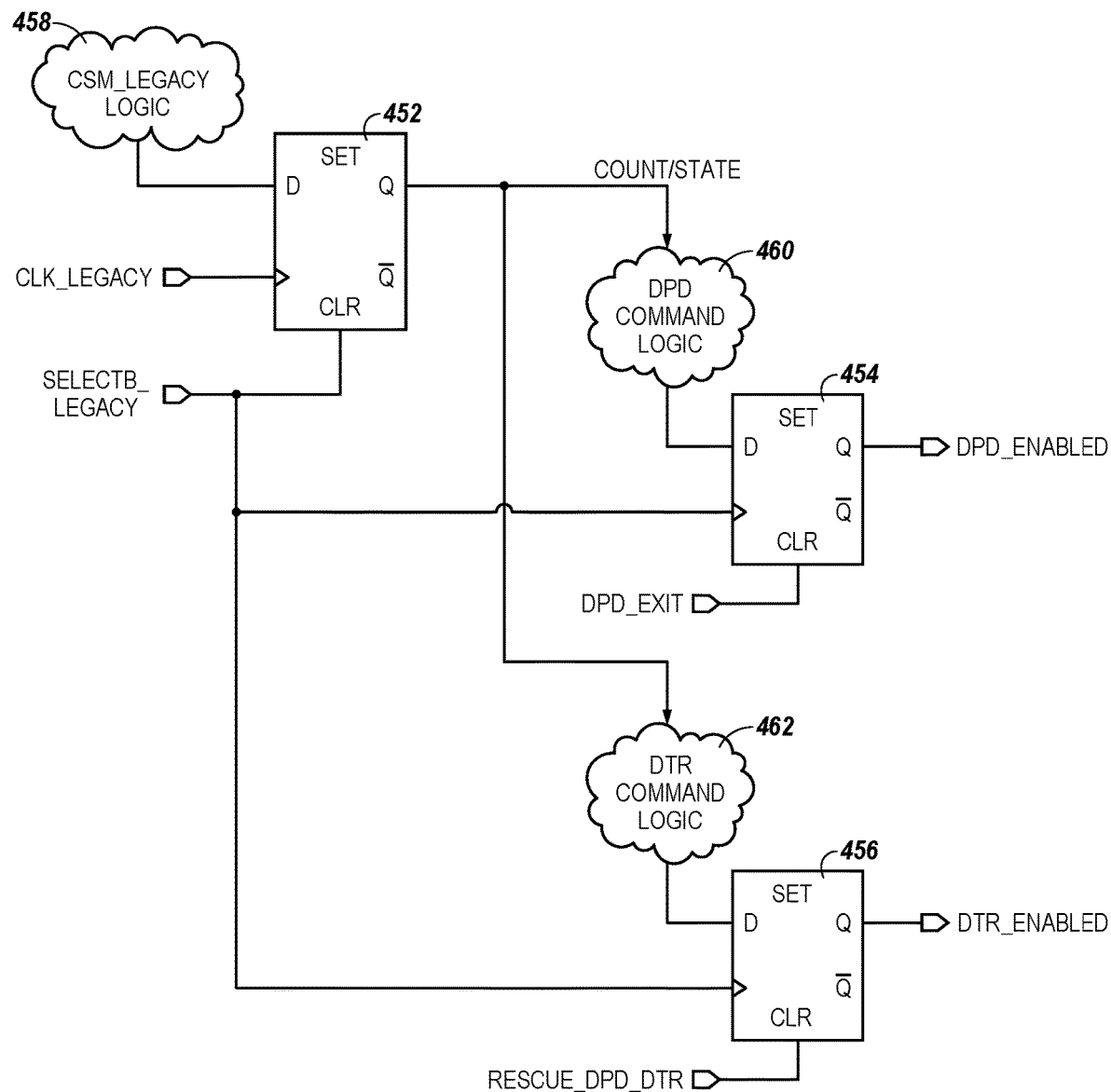
FIG. 4 illustrates a command state machine logic configured to process commands on one edge type of a clock in accordance with a number of embodiments of the present disclosure.

FIG. 4 illustrates a command state machine (CSM) logic configured to process commands on one edge type, e.g., a rising edge, of a clock in accordance with a number of embodiments of the present disclosure. FIG. 4 illustrates the detail of an example first CSM 334 shown in FIGS. 3A and 3B. That is, FIG. 4 is a register-level diagram of the legacy CSM 334, which can include a first D type flip-flop 452, a second D type flip-flop 454, and a third D type flip-flop 456. The D input of the first D type flip-flop 452 is coupled to legacy CSM logic 458, the clock input of the first D type flip-flop 452 is coupled to the CLK_LEGACY signal line, e.g., from the clock generator 332 shown in FIGS. 3A and 3B, and the clear (CLR) input of the first D type flip-flop 452 is coupled to the SELECTB_LEGACY signal line, e.g., from the select generator 330 shown in FIGS. 3A and 3B. The output (Q) of the first D type flip-flop 452 is coupled to the DPD command logic 460 and to the DTR command logic 462.

The D input of the second D type flip-flop 454 is coupled to DPD command logic 460, the clock input of the second D type flip-flop 454 is coupled to the SELECTB_LEGACY signal line, e.g., from the select generator 330 shown in FIGS. 3A and 3B, and the clear (CLR) input of the second D type flip-flop 454 is coupled to the DPD_EXIT signal line, e.g., from the DTR+DPD CSM 336 shown in FIGS. 3A and 3B. The output (Q) of the second D type flip-flop 454 is coupled to the DPD_ENABLED signal line (which is coupled to an input of AND gate 338 shown in FIGS. 3A and 3B).

The D input of the third D type flip-flop 456 is coupled to DTR command logic 462, the clock input of the third D type flip-flop 456 is coupled to the SELECTB_LEGACY signal line, e.g., from the select generator 330 shown in FIGS. 3A and 3B, and the clear (CLR) input of the third D type flip-flop 456 is coupled to the RESCUE_DPD_DTR signal line, e.g., from the DTR+DPD CSM 336 shown in FIGS. 3A and 3B. The output (Q) of the third D type flip-flop 456 is coupled to the DTR_ENABLED signal line (which is coupled to an input of AND gate 338 shown in FIGS. 3A and 3B).

From the configuration for the legacy CSM 334 provided in FIG. 4, the output (Q) of the first D type flip-flop 452, e.g., the COUNT/STATE signal, is synchronously clocked by the rising edge of the CLK_LEGACY signal, and asynchronously reset by the SELECTB_LEGACY signal. The DPD_ENABLED signal and the DTR_ENABLED signal are synchronously clocked by the rising edge of the SELECTB_LEGACY signal, and asynchronously reset by the DPD_EXIT signal and the RESCUE_DPD_DTR signal, respectively.

Figure 5:
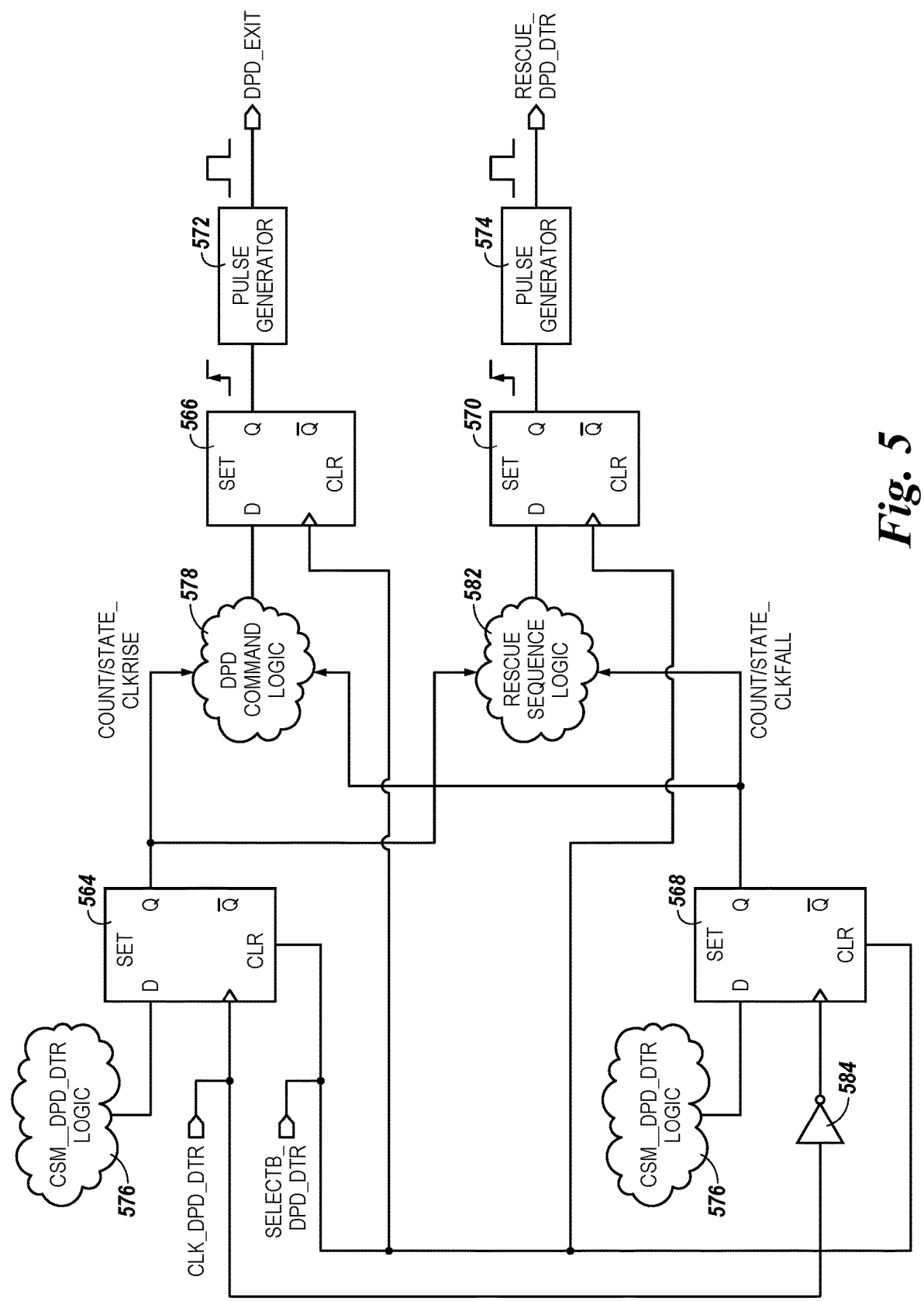
FIG. 5 illustrates a command state machine logic configured to process commands on both edge types of a clock in accordance with a number of embodiments of the present disclosure.

FIG. 5 illustrates a command state machine logic configured to process commands on both edge types, e.g., rising and falling edges, of a clock in accordance with a number of embodiments of the present disclosure. FIG. 5 is a register-level diagram of the DTR+DPD CSM 336 shown in FIGS. 3A and 3B. That is, FIG. 5 is a register-level diagram of the DTR+DPD CSM 336, which can include a first D type flip-flop 564, a second D type flip-flop 566, a third D type flip-flop 568, and a fourth D type flip-flop 570.

The D input of the first D type flip-flop 564 is coupled to CSM_DPD_DTR logic 576, the clock input of the first D type flip-flop 564 is coupled to the CLK_DPD_DTR signal line, e.g., from the clock generator 332 shown in FIGS. 3A and 3B, and the clear (CLR) input of the first D type flip-flop 564 is coupled to the SELECTB_DPD_DTR signal line, e.g., from the select generator 330 shown in FIGS. 3A and 3B. The output (Q) of the first D type flip-flop 564 is coupled to the DPD command logic 578 and the rescue sequence logic 582.

The D input of the second D type flip-flop 566 is coupled to DPD command logic 578, the clock input of the second D type flip-flop 566 is coupled to the SELECTB_DPD_DTR signal line, e.g., from the select generator 330 shown in FIGS. 3A and 3B, and the clear (CLR) input of the second D type flip-flop 566 is uncoupled. The output (Q) of the second D type flip-flop 566 is coupled to an input of a first pulse generator 572. The output of the first pulse generator 572 is coupled to the DPD_EXIT signal line (which, in turn, is coupled to the legacy CSM 334 as shown in FIGS. 3A and 3B).

The D input of the third D type flip-flop 568 is coupled to CSM_DPD_DTR logic 576, the clock input of the third D type flip-flop 568 is coupled to an output of inverting buffer 584 having the CLK_DPD_DTR signal line, e.g., from the clock generator 332 shown in FIGS. 3A and 3B, as the input, and the clear (CLR) input of the third D type flip-flop 568 is coupled to the SELECTB_DPD_DTR signal line, e.g., from the select generator 330 shown in FIGS. 3A and 3B. The output (Q) of the third D type flip-flop 568 is coupled to the DPD command logic 578 and the rescue sequence logic 582.

The D input of the fourth D type flip-flop 570 is coupled to the rescue sequence logic 582, the clock input of the fourth D type flip-flop 570 is coupled to the SELECTB_DPD_DTR signal line, e.g., from the select generator 330 shown in FIGS. 3A and 3B, and the clear (CLR) input of the fourth D type flip-flop 566 is uncoupled. The output (Q) of the fourth D type flip-flop 570 is coupled to an input of a second pulse generator 574. The output of the second pulse generator 574 is coupled to the RESCUE_DPD_DTR signal line (which, in turn, is coupled to the legacy CSM 334 as shown in FIGS. 3A and 3B).

From the configuration for the DTR+DPD CSM 336 provided in FIG. 5, the output (Q) of the first D type flip-flop 564, e.g., the COUNT/STATE_CLKRISE signal, is synchronously clocked by the rising edge of the CLK_DPD_DTR signal, and asynchronously reset by the SELECTB_DPD_DTR signal. From the configuration for the DTR+DPD CSM 336 provided in FIG. 5, it is apparent that the output (Q) of the third D type flip-flop 568, e.g., the COUNT/STATE_CLKFALL signal, is synchronously clocked by the falling edge of the CLK_DPD_DTR signal, and asynchronously reset by the SELECTB_DPD_DTR signal. Also, the DPD_EXIT signal and the RESCUE_D-PD_DTR signal are synchronously clocked by the rising edge of the SELECTB_DPD_DTR signal, to trigger a pulse output from the respective pulse generators 572 and 574.

Figure 6A:
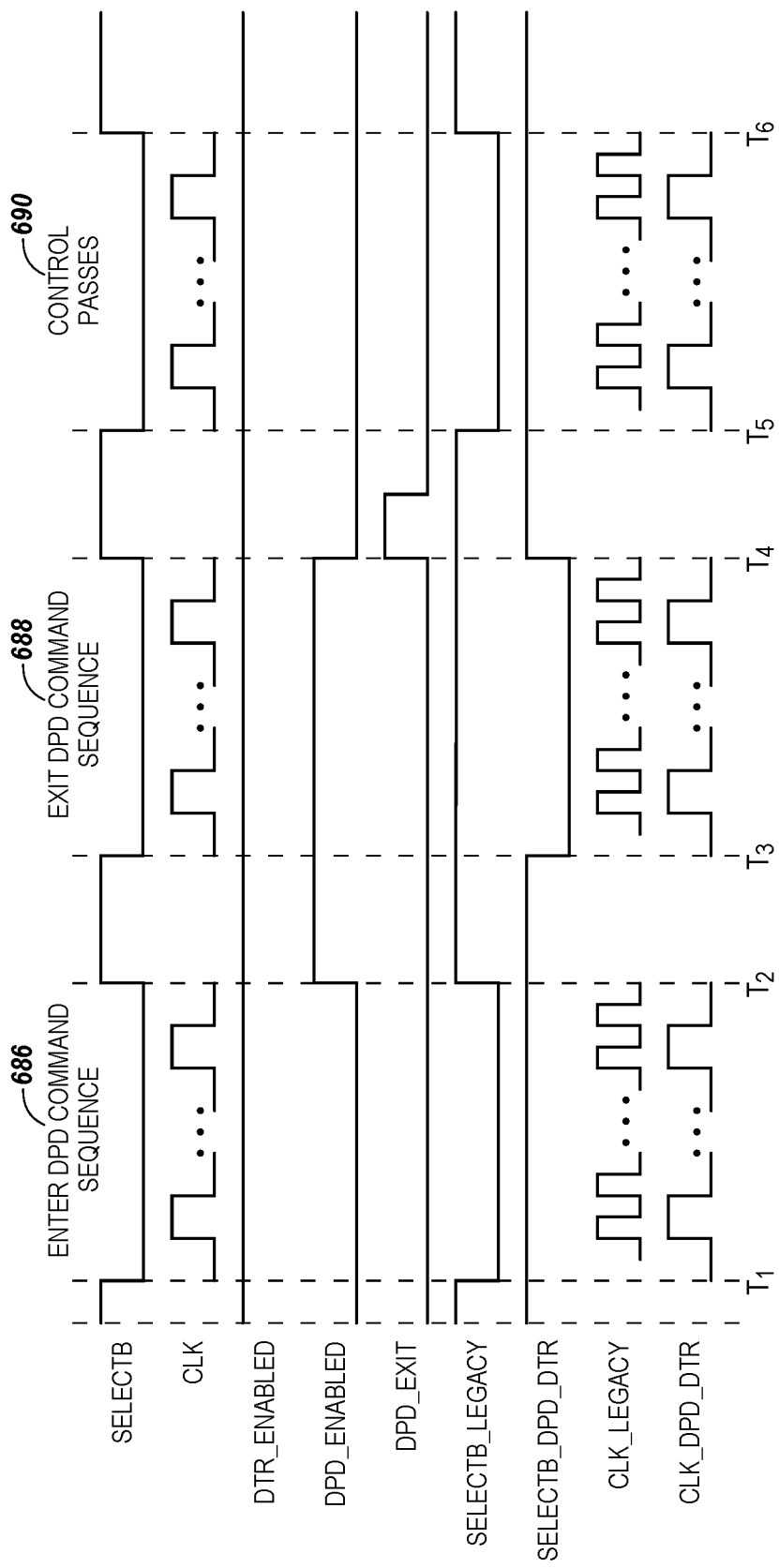
FIG. 6A shows a timing diagram illustrating a serial peripheral interface (such as shown in FIG. 3A) exit from a deep power down mode in accordance with a number of embodiments of the present disclosure.

FIG. 6A shows a timing diagram illustrating a serial peripheral interface (such as shown in FIG. 3A) exit from a deep power down mode in accordance with a number of embodiments of the present disclosure. FIG. 6A is a timing diagram that illustrates how the legacy CSM 334 and the DTR+DPD CSM 336 (shown in FIG. 3A) can switch control based on the state of the DTR_ENABLED signal and the DPD_ENABLED signal, and a command sequence received to the particular CSM.

The waveforms illustrated in FIG. 6A shows that the slave device (including the SPI) starts with DTR_ENABLED signal is set to 1 (indicating DTR mode is enabled) and the DPD_ENABLED signal is set to 0, which gives command processing control to the legacy CSM 224. After the legacy CSM 334 processes an Enter DPD Command Sequence 686 with a frequency-doubled version of CLK (on the CLK_LE-GACY signal line), the DPD_ENABLED signal gets set on the rising edge of the SELECTB_LEGACY signal. The Enter DPD command sequence sets the DPD_ENABLED signal, e.g., set equal to 1, reflecting that the DPD mode is enabled. Thereafter, the DTR_ENABLED signal is set to equal 1, and command processing control is passed to the DTR+DPD CSM 336.

After the DTR+DPD CSM 336 processes an Exit DPD Command Sequence 688 with both rising and falling edges of the CLK_DPD_DTR signal, the DPD_ENABLED signal gets asynchronously reset when the DPD_EXIT signal pulses high. Thereafter, the DTR_ENABLED signal is set to 1, the DPD_ENABLED signal is set to 0, and command processing control is passed to the legacy CSM 334, as indicated at the Control Passes 690.

During each of the Enter DPD Command Sequence 686 and Control Passes 690, the SELECTB_LEGACY signal tracks the SELECTB signal, and the SELECTB_DPD_DTR signal remains set because both DTR and DPD modes are not enabled, as shown in FIG. 6A. The CLK_LEGACY signal is a frequency-doubled version of the input CLK signal, e.g., SCLK generated by a master, and is used by the legacy CSM 334 because the SELECTB_LEGACY signal goes low. The CLK_DPD_DTR signal is not used by the DTR+DPD CSM 336 since the SELECTB_DPD_DTR signal remains set (thereby not selecting the DTR+DPD CSM 336 as discussed with respect to FIG. 5).

As shown in FIG. 6A for the Exit DPD Command Sequence 688, the SELECTB_DPD_DTR signal tracks the SELECTB signal, and the SELECTB_LEGACY signal remains set because both DTR and DPD modes are enabled. The CLK_LEGACY signal is not used by the legacy CSM 334 since the SELECT LEGACY signal remains set. The CLK_DPD_DTR signal is the same frequency as the input CLK signal, and is used by the DTR+DPD CSM 336 since the SELECTB_DPD_DTR signal goes low, thereby selecting the DTR+DPD CSM 336 for command processing.

The Exit DPD Command Sequence 688 sets the DPD_EXIT signal, which in turn resets the DPD_EN-ABLED signal, indicating the DPD mode is disabled.

Figure 6B:
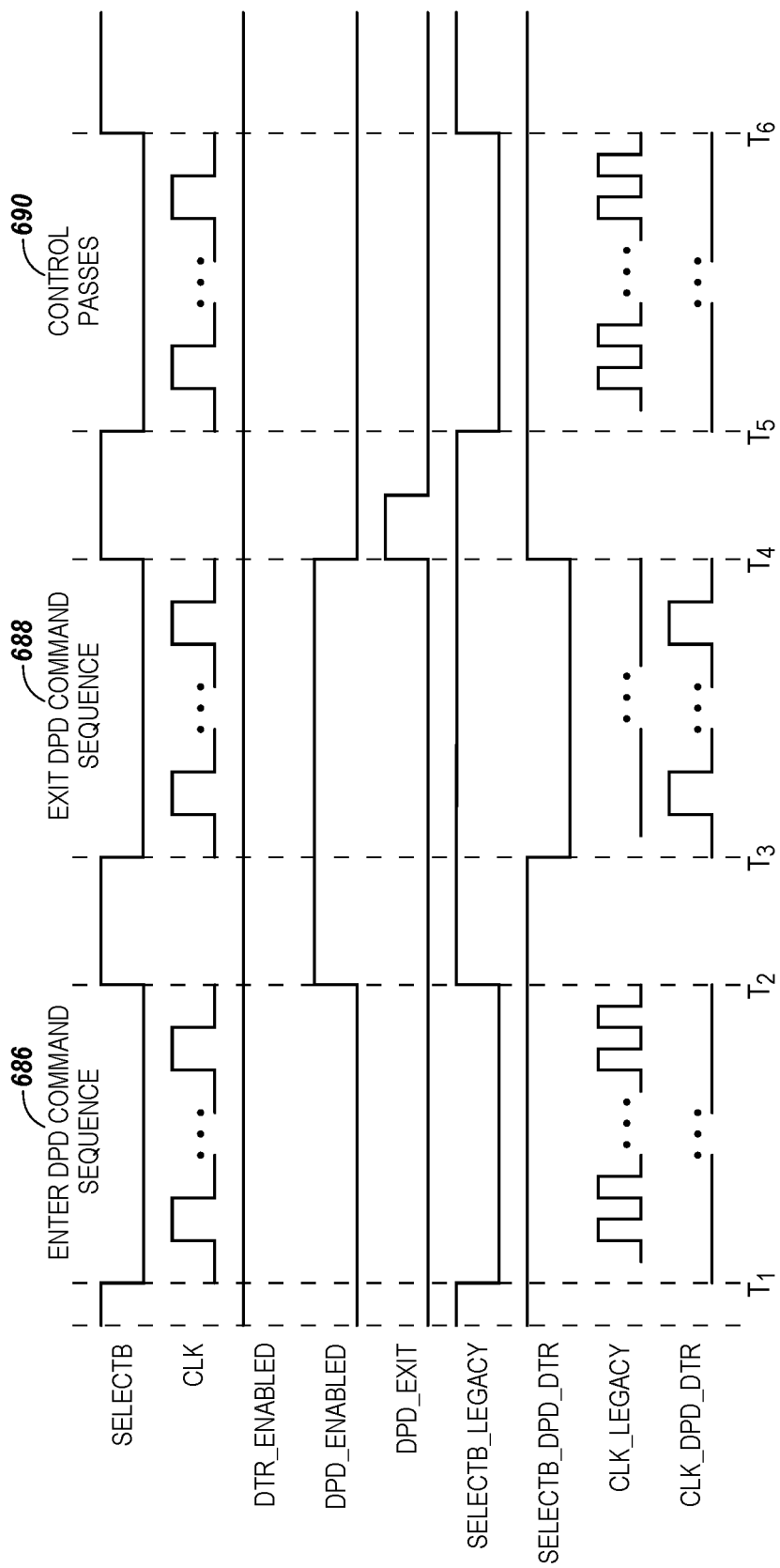
FIG. 6B shows a timing diagram illustrating a serial peripheral interface (such as shown in FIG. 3B) exit from a deep power down mode in accordance with a number of embodiments of the present disclosure.

FIG. 6B shows a timing diagram illustrating a serial peripheral interface (SPI) (such as shown in FIG. 3B) exit from a deep power down mode in accordance with a number of embodiments of the present disclosure. The timing diagram shown in FIG. 6B is similar to that shown in FIG. 6A with the exception that one of clock signals CLK_LEGACY or CLK_DPD_DTR is gated depending on whether or not the SPI is in both DPD and DTR modes as discussed with respect to FIG. 3B.

For example, FIG. 6B shows that between times $T_1$ and $T_2$, the CLK_DPD_DTR signal provided to CSM_DPD_DTR 336 is not toggling while the SPI is not in both the DTR and DPD modes, e.g., DPD_ENABLED signal is low. Because the SPI is in DTR mode the CLK_LEGACY signal is the frequency-doubled version of the CLK signal.

Between times $T_3$ and $T_4$ the SPI is in both the DTR and DPD modes, as indicated by both of the DTR_ENABLED and DPD_ENABLED signals being high, and the CLK_DPD_DTR signal provided to CSM_DPD_DTR 336, which is selected to process commands while in both the SPI is in both DTR and DPD modes, follows the CLK signal. Between times $T_3$ and $T_4$, the CLK_LEGACY signal is not toggling since the output of AND gate 347 shown in FIG. 3B is being held low by the inverted input derived from the output of AND gate 338.

Between times $T_5$ and $T_6$ the SPI is not in both the DTR and DPD modes, as indicated by the DPD_ENABLED signal being low, so that the CLK_DPD_DTR signal provided to CSM_DPD_DTR 336 is held low, e.g., no toggling, by AND gate 349 shown in FIG. 3B. The CLK_LEGACY signal is the frequency-doubled version of the CLK signal since the SPI is in DTR mode, which follows the output of multiplexer 348 shown in FIG. 3B, and passes through AND gate 347 shown in FIG. 3B because the inverted input derived from the output of AND gate 338 is held high when the SPI is not in both DPD and DTR modes.

Figure 7A:
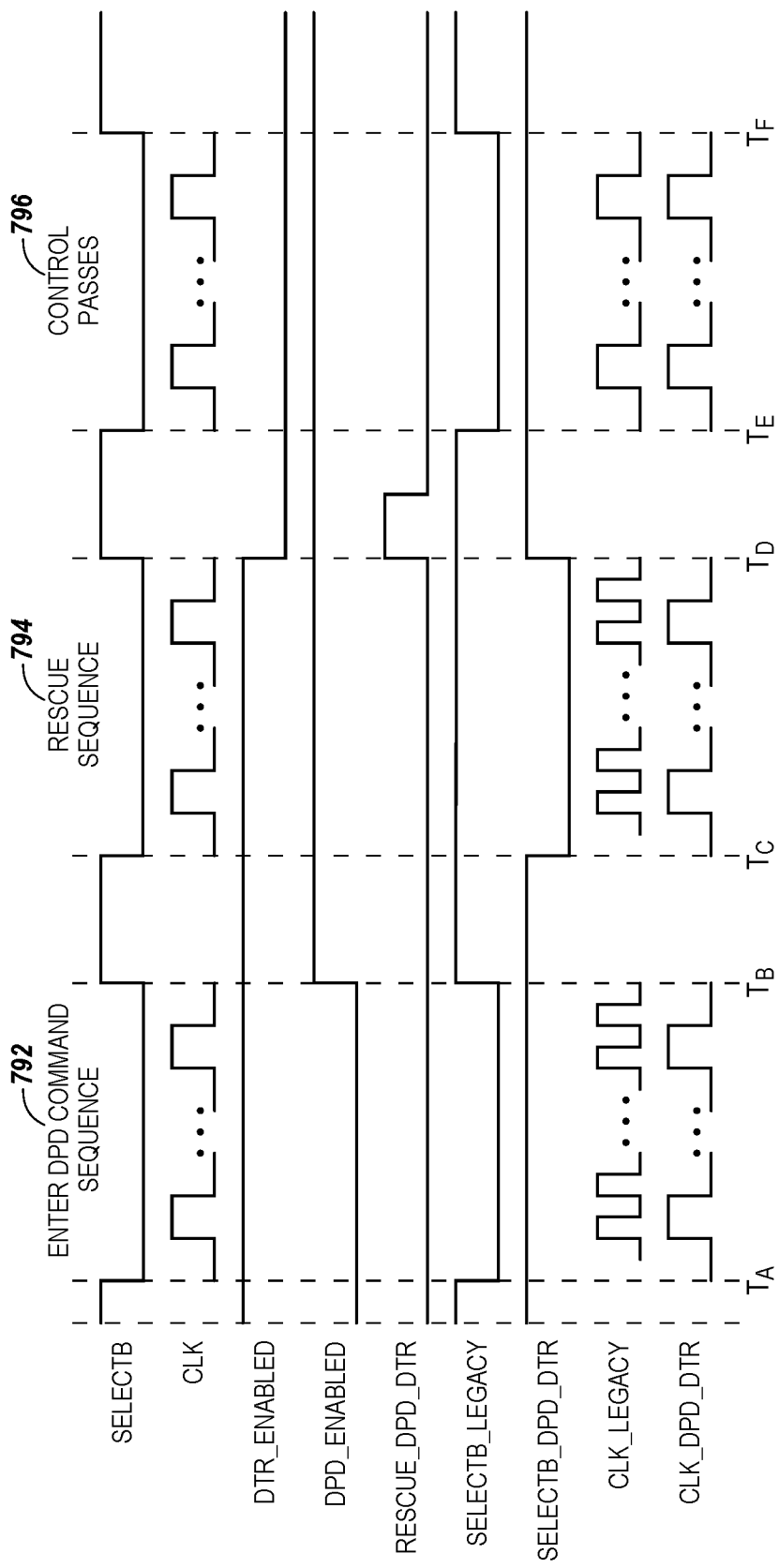
FIG. 7A shows a timing diagram illustrating a serial peripheral interface (such as shown in FIG. 3A) rescue in a deep power down mode in accordance with a number of embodiments of the present disclosure.

FIG. 7A shows a timing diagram illustrating a serial peripheral interface (such as shown in FIG. 3A) rescue in a deep power down mode in accordance with a number of embodiments of the present disclosure. The waveform in FIG. 7A show that the slave device (with the SPI) starts with the DTR_ENABLED signal set to 1 (indicating DTR mode is enabled) and the DPD_ENABLED signal set to 0, which gives command processing control to the legacy CSM 334. After the legacy CSM 334 processes the Enter DPD Command Sequence 792 using a frequency-doubled version of the input CLK signal, e.g., 2×SCLK, the DPD_ENABLED signal gets set on the rising edge of the SELECTB_LEGACY signal. Thereafter, the DTR_ENABLED signal is set to 1, the DPD_ENABLED signal is set to 1, and the command processing control is passed to the DTR+DPD CSM 336.

After the DTR+DPD CSM 336 processes the Rescue Sequence 794 with both rising and falling edges of the CLK_DPD_DTR signal, the DTR_ENABLED signal gets asynchronously reset when the RESCUE_DPD_DTR signal pulses high. Thereafter, the DTR_ENABLED signal is set to 0, the DPD_ENABLED signal is set to 1, and the command processing control is passed to the legacy CSM 334, as indicated at Control Passes 796. Since the DTR_ENABLED signal is set to 0, the legacy CSM 334 will process commands on the rising edge of the CLK_LEGACY signal, which is the raw input CLK signal. e.g., SCLK.

During each of the Enter DPD Command Sequence 792 and Control Passes 796, the SELECTB_LEGACY signal tracks the SELECTB signal, and the SELECTB_DPD_DTR signal remains set because both DTR and DPD modes are not enabled, as shown in FIG. 7A. The CLK_LEGACY signal is the same frequency as the CLK signal because the DTR_ENABLED signal is reset. The CLK_LEGACY signal is used by the legacy CSM 334 because the SELECTB_LEGACY signal goes low. The CLK_DPD_DTR signal is not used by the DTR+DPD CSM 336 since the SELECTB_DPD_DTR signal remains set (thereby not selecting the DTR+DPD CSM 336 since the select signal is active low).

As shown in FIG. 7A for the Rescue Sequence 794, the SELECTB_DPD_DTR signal tracks the SELECTB signal, and the SELECTB_LEGACY signal remains set because both DTR and DPD modes are enabled. The CLK_LEGACY signal is not used by the legacy CSM 334 since the SELECTB_LEGACY signal (active low) remains set. The CLK_DPD_DTR signal is the same frequency as the input CLK signal, and is used by the DTR+DPD CSM 336 since the SELECTB_DPD_DTR signal goes low. The Rescue Sequence 794 sets the RESCUE_DPD_DTR signal, which in turn resets the DTR_ENABLED signal, indicating the DTR mode is disabled.

Figure 7B:
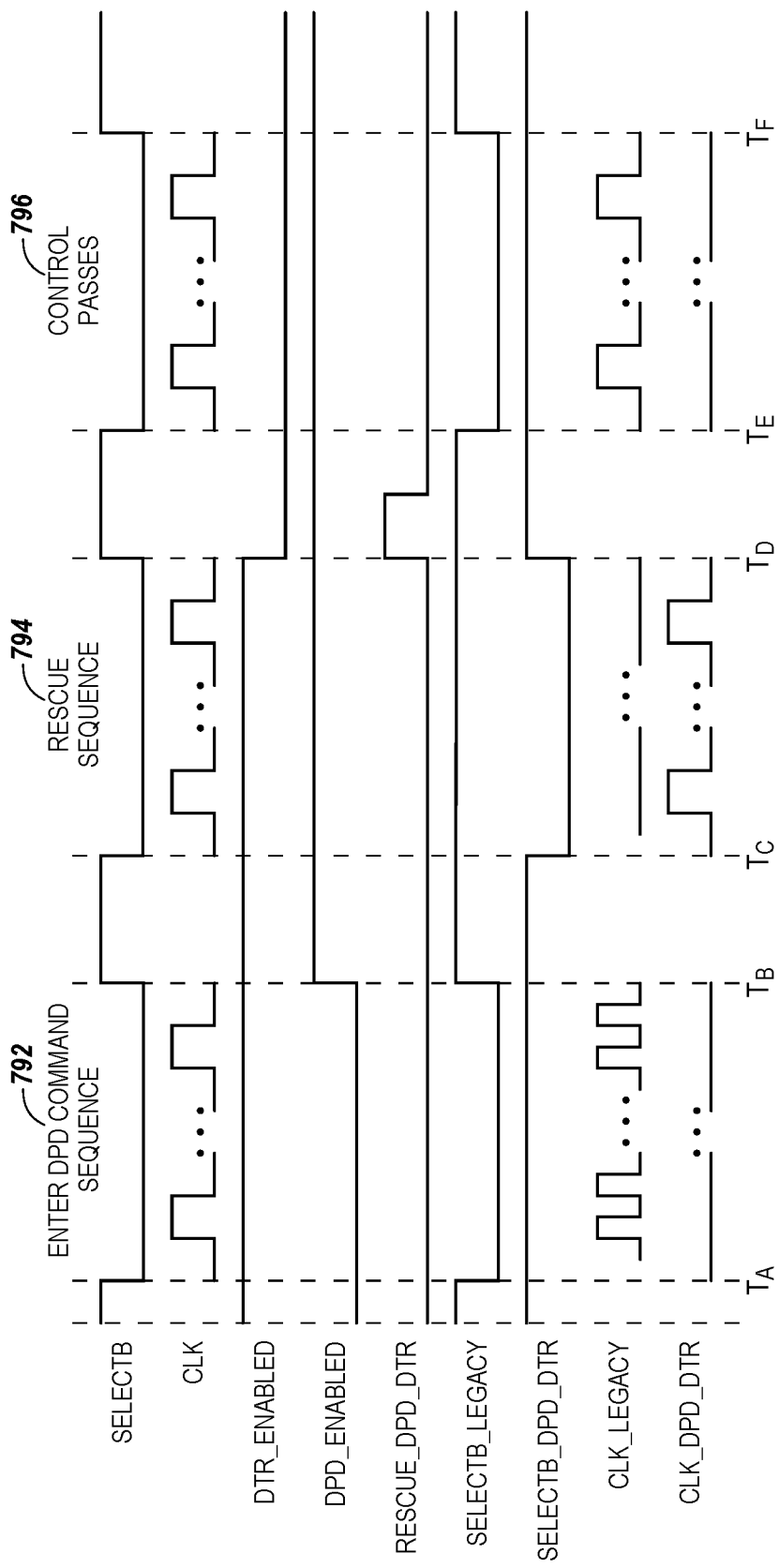
FIG. 7B shows a timing diagram illustrating a serial peripheral interface (such as shown in FIG. 3B) rescue in a deep power down mode in accordance with a number of embodiments of the present disclosure.

FIG. 7B shows a timing diagram illustrating a serial peripheral interface (such as shown in FIG. 3B) rescue in a deep power down mode in accordance with a number of embodiments of the present disclosure. The timing diagram shown in FIG. 7B is similar to that shown in FIG. 7A with the exception that one of clock signals CLK_LEGACY or CLK_DPD_DTR is gated depending on whether or not the SPI is in both DPD and DTR modes as discussed with respect to FIG. 3B.

For example, FIG. 7B shows that between times $T_A$ and $T_B$, the CLK_DPD_DTR signal provided to CSM_DPD_DTR 336 is not toggling while the SPI is not in both the DTR and DPD modes, e.g., DPD_ENABLED signal is low. Because the SPI is in DTR mode the CLK_LEGACY signal is the frequency-doubled version of the CLK signal.

Between times $T_C$ and $T_D$ the SPI is in both the DTR and DPD modes, as indicated by both of the DTR_ENABLED and DPD_ENABLED signals being high, and the CLK_DPD_DTR signal provided to CSM_DPD_DTR 336, which is selected to process commands while in both the SPI is in both DTR and DPD modes, follows the CLK signal. Between times $T_3$ and $T_4$, the CLK_LEGACY signal is not toggling since the output of AND gate 347 shown in FIG. 3B is being held low by the inverted input derived from the output of AND gate 338.

Between times $T_E$ and $T_F$ the SPI is not in both the DTR and DPD modes, as indicated by the DTR_ENABLED signal being low, so that the CLK_DPD_DTR signal provided to CSM_DPD_DTR 336 is held low, e.g., no toggling, by AND gate 349 shown in FIG. 3B. The CLK_LEGACY signal corresponds to the CLK signal since the SPI is not in DTR mode. The CLK signal is selected by multiplexer 348 when the SPI is not in the DTR mode and passes through AND gate 347 shown in FIG. 3B because the inverted input derived from the output of AND gate 338 is held high when the SPI is not in both DPD and DTR modes.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a serial peripheral interface (SPI) including:
        a first command state machine (CSM);
        a second CSM; and
        a clock generator,
    wherein the SPI is configured such that:
        the first CSM, the second CSM, or both are configured to process commands in both a Single Transfer Rate (STR) mode and a Double Transfer Rate (DTR) mode;
        at least one of the first CSM or the second CSM is configured to process commands while in a Deep Power Down Mode and the DTR mode responsive to synchronous command signals transmitted by the SPI;
        the first CSM is configured to receive/transmit data on a rising edge of the clock signal; and
        the second CSM is configured to receive/transmit data on the rising edge and on a falling edge of the clock signal.

2. The apparatus of claim 1, wherein the first CSM is selected to process commands while the SPI is not in the DPD mode, and the first CSM is not selected to process commands while the SPI is in the DPD mode.

3. The apparatus of claim 1, wherein the second CSM is configured to pass command processing control to the first CSM in STR mode.

4. The apparatus of claim 1, wherein the second CSM is configured to pass command processing control to the first CSM in DTR mode.

5. The apparatus of claim 1, wherein the second CSM is not selected to process commands while the SPI is not in the DPD mode.

6. The apparatus of claim 1, wherein the SPI is configured such that only one of the first CSM and second CSM is selected to process commands during a command sequence.

7. An apparatus, comprising:
    a serial peripheral interface (SPI) including:
        a first command state machine (CSM) configured to receive/transmit data on a first edge of a first clock signal;
        a second CSM configured to receive/transmit data on a first edge and on a second edge of a second clock signal;
        a clock generator configured to assert signaling on the first CSM, the second CSM, or both to cause at least one of the first CSM or the second CSM to process commands while in a Deep Power Down Mode and a Double Transfer Rate (DTR) mode responsive to synchronous command signals generated by the SPI; and
        a select generator configured to select only one of the first CSM and the second CSM for command processing during a particular command sequence.

8. The apparatus of claim 7, wherein the select generator is configured to select the second CSM for command processing responsive to the SPI being simultaneously in the DTR mode and the DPD mode.

9. The apparatus of claim 7, wherein the select generator is configured to select the first CSM for command processing responsive to the SPI being in a Single Transfer Rate (STR) mode and the DPD mode.

10. The apparatus of claim 7, wherein the select generator is configured to select the first CSM for command processing responsive to the SPI being in a Single Transfer Rate (STR) mode and not in the DPD mode.

11. The apparatus of claim 7, wherein the select generator is configured to select the second CSM for command processing responsive to the SPI being in the DTR mode and not in the DPD mode.

12. The apparatus of claim 7, wherein the first clock signal is a frequency-multiplied clock signal.

13. The apparatus of claim 7, wherein the second CSM is configured to process a command causing exit of the DPD mode.

14. The apparatus of claim 7, wherein the first edge is a rising clock signal edge and the second edge is a falling clock signal edge.

15. A method, comprising:
    synchronously processing commands in a serial peripheral interface (SPI) using a first command state machine (CSM) while the first CSM is able to properly process commands;
    determining that the first CSM is unable to properly process commands based an operational characteristic associated with the first CSM;
    selectively enabling, by the SPI, a second CSM based on the determination that the first CSM is unable to properly process commands;
    synchronously processing commands in the SPI using the second CSM while the first CSM is unable to properly process commands
    synchronously processing commands using at least one of the first CSM or the second CSM while the first CSM or the second CSM is in a Deep Power Down Mode, a Double Transfer Rate mode, or both, responsive to signaling received from a clock generator coupled to the first CSM and the second CSM and synchronous command signals generated by the SPI,
    wherein the first CSM is configured to receive/transmit data on a first edge of a clock signal and the second CSM is configured to receive/transmit data on the first edge and on a second edge of the clock signal.

16. The method of claim 15, further comprising synchronously processing commands in the SPI using the first CSM while the SPI is not in both the DTR mode and the DPD mode.

17. The method of claim 15, further comprising synchronously processing commands in the SPI using the second CSM while the SPI is in both the DTR a-mode and the DPD mode.

18. The method of claim 15, further comprising doubling a frequency of the clock signal provided to the first CSM responsive to the SPI being in the DTR mode.

19. The method of claim 15, further comprising passing processing of commands from the second CSM to the first CSM after processing an exit DPD command sequence by the second CSM.

20. The method of claim 15, further comprising passing processing of commands from the second CSM to the first CSM after processing a rescue command sequence by the second CSM.

* * * * *